Patented Oct. 25, 1932

1,884,633

UNITED STATES PATENT OFFICE

CARLETON ELLIS, OF MONTCLAIR, NEW JERSEY, ASSIGNOR TO CHADELOID CHEMICAL COMPANY, OF NEW YORK, N. Y., A CORPORATION OF WEST VIRGINIA

PAINT, VARNISH, AND LACQUER REMOVER

No Drawing. Application filed October 12, 1928. Serial No. 312,212.

This invention relates to a composition adapted for the softening and removal of dried coatings of paint, varnish, lacquer, and the like, and relates in particular to a removing composition which is free or practically free from benzol.

The customary type of organic solvent remover on the market is made from wax, benzol and acetone or alcohol or mixtures of the two latter substances. The benzol serves as a solvent for the wax and the alcoholic or ketonic body as a precipitant, thereby placing the wax in a condition where it forms an evaporation-retarding film preventing the rapid escape of the solvents.

Benzol has been attacked on hygienic grounds, it being asserted that its vapors cause impoverishment of the blood and other maladies. It is not within the purview of this application to enter into a discussion of the merits or demerits of benzol, it being the object of the invention to provide a remover which is free from benzol at least in any proportion which might be alleged to be toxic.

Replacement of benzol by other solvents to make a remover having the rapid cutting qualities of the standard benzol remover is by no means a simple matter. If petroleum hydrocarbons are used their immiscibility with many other solvents is objectionable and, furthermore, petroleum hydrocarbons are not rapid penetrating agents; whereas benzol is an excellent penetrant and therefore materially fortifies the loosening action of the alcoholic and ketonic solvents.

Hydrocarbon solvents which have a slower rate of evaporation are usually undesirable because they normally would be mixed with highly volatile solvents of great loosening power, such as acetone and methyl acetone, anhydrous methyl alcohol, and the like, and these volatile substances are liable to evaporate at a greater speed than the heavier hydrocarbon solvents resulting in a dissolution of the waxy protecting film.

In the present invention use is made of a chlorinated substance, namely monochlorobenzene, which I have found, despite its relatively high boiling point, to have powerful penetrating qualities at least equal to those exhibited by benzol. This chlorinated solvent is also regarded as free from any objectionable effect on the operators so that it may be used freely without the danger to health which has been charged against benzol.

Furthermore, although monochlorobenzene is a much heavier solvent than benzol and therefore should exert an effect on highly volatile solvents, such that the remover would be expected to dry up quickly, I have found that such an objectionable feature does not obtain and that it is possible to prepare removers having a low rate of evaporation approximating that of one of the standard removing compositions heretofore proposed. This for the purposes of illustration may be typified by a mixture of solvents containing from 50 to 60% of benzol, the balance being methyl acetone; the composition carrying about 3 ounces of paraffin wax per gallon.

Therefore the invention centers around the employment of monochlorobenzene as a wax solvent and penetrating agent. With this solvent I preferably employ a highly volatile ester, such as methyl acetate, a ketone, such as acetone, and a lower alcohol, such as methanol, which preferably is employed in the anhydrous form. It is also desirable to have acetone or methyl acetone, methyl acetate and the like, anhydrous or substantially so.

As a wax evaporation-retarding agent I prefer to employ ceresin for reasons which will be hereinafter stated. Preferably the proportion of ceresin wax is very low, usually not exceeding one or two ounces per gallon of the removing composition. Also I may employ paraffin wax, beeswax and other evaporation-retarding substances.

Also in the composition I preferably have present a small proportion of nitrocellulose or other cellulose ester, preferably of high viscosity, so that 2 or 3% of such cellulose compound will give to the composition a syrupy consistency. Furthermore I find the nitrocellulose acts as a peptizing agent for the wax maintaining it in quite uniform distribution. In the older types of removers containing much higher proportions of wax it was of no particular consequence if some of the wax settled to the bottom and was not thoroughly and uniformly distributed because ordinarily there would be present enough wax to meet the evaporation requirements. With the present preferred low wax composition uniform distribution is highly important and this is secured in two ways: 1. By means of the nitrocellulose dispersing agent, and, 2, by employment of the monochlorobenzene in a proportion sufficient to increase the specific gravity of the solvent to a point approximating that of wax thereby reducing the settling tendency so noticeable in the paraffin wax, benzol, acetone removers of the prior art.

Such higher wax removers also possess the disadvantage of a high congealing point with the result that in cool weather the remover would become too stiff and pasty to be spread advantageously. This congealation is due to freezing of wax almost completely to solidify or over-thicken the entire composition. In the present remover the preferred wax content is so low that such congealation is not nearly as much in evidence and due to the presence of nitrocellulose, a dispersion exists which is apparently less affected by reduction in temperature. Hence I may place a specimen of remover in a container and immerse it in ice or ice water without any substantial thickening, the composition retaining a syrupy and brushable consistency.

Also another important requirement which is well met by the present composition is the reduction of wax-hazard. Removers containing a higher content of wax frequently will be found to leave on the surface which has been cleaned a thin film of wax which affects the drying of subsequent coatings. While paint and varnish are not so much affected, it has been found that nitrocellulose lacquer is very sensitive to wax and that a tiny amount of it remaining on the surface will seriously impair drying; since the virtue of lacquer in part is its rapidity of drying it will be evident that any objectionable residue of wax should be removed before a surface is coated with lacquer. Despite the employment of washes it not infrequently happens that traces of wax remain upon the cleaned surface, and cause difficulty. The present invention succeeds in reducing this wax-hazard by substantial diminution of the content of wax in the remover and preferably by having nitrocellulose of high viscosity present in an amount in excess of the wax and tending to so modify the wax that it will be more readily removed by washing liquids of the organic solvent type, soap and water, and the like.

As an illustration of a removing composition which I find to be effective, the following will serve:

| | |
|---|---|
| Monochlorobenzene | 10½ gallons |
| Anhydrous methanol | 8 gallons |
| Acetone or methyl acetone | 4 gallons |
| Methyl acetate | 4 gallons |
| Ceresin wax | 2¼ pounds |
| Nitrocellulose of high viscosity | 4½ pounds |

These components may be mixed in any suitable manner, a convenient method being to melt the wax, dissolve it in the monochlorobenzene and add this solution to a solution of the nitrocellulose in the remaining solvents. The nitrocellulose if desired may be celluloid scrap or smokeless powder. The ceresin wax advantageously may be previously dissolved in a solvent such as benzol and precipitated with alcohol to remove the softer portions, the latter remaining in solution. The precipitate is collected and dried and employed in the foregoing. Wax of this character may be used in lower proportion than the softer forms of normal ceresin. Oxy-ceresin wax prepared by air-blowing the melted wax for several hours also may be found useful and is recommended for compositions which are to be used for surfaces on which lacquer later is to be applied. Blowing at a temperature of 150–160° C. for a period of five to ten hours suffices to prepare the oxy-ceresin.

This remover has a cutting speed on an old dried paint surface slightly better than that exhibited by the best of the removers of the standard benzol type on the market which I have had occasion to test in this manner. In such tests I have endeavored to select those brands of commercial remover which had a leading position in the market.

Another removing composition which also exhibits a satisfactory low rate of evaporation and possesses a cutting speed nearly equal to the foregoing composition is the following:

| | |
|---|---|
| Monochlorobenzene | 26½ gallons |
| Methyl acetate | 10½ gallons |
| Acetone | 10½ gallons |
| " Lugosol " | 5¼ gallons |
| Ceresin wax | 4½ pounds |
| High viscosity nitrocellulose | 9 pounds |

As the proportion of wax and nitrocellulose increases the cutting speed decreases. This is especially true with increments of wax. Hence by reducing the proportion of wax to a minimum in the presence of a dispersing agent, which likewise is not present in an excessive amount, and by employing monochlorobenzene to increase the specific gravity of the composition to approximate that of wax I secured a set of factors which provide a remover of the high rate of cutting speed exhibited by the first mentioned composition, and in which the wax is held in a highly stable physical state. The second composition although slower has a body or consistency which renders it well adapted for application to ceilings and other places where dripping of the remover from the brush upon the operator would be objectionable.

Also it is possible to reduce the cost of the remover somewhat although with a certain sacrifice in cutting speed by the addition of petroleum spirit such as casinghead naphtha. The latter preferably is a low fraction free from wild gas but having the heavier ends removed. A distillate ranging from 60° to 120° C. is useful, a formula containing which is the following:

| | |
|---|---|
| Monochlorobenzene | 5¼ gallons |
| Casinghead naphtha | 5¼ gallons |
| Anhydrous methanol | 8 gallons |
| Acetone | 4 gallons |
| Methyl acetate | 4 gallons |
| Ceresin | 2¼ pounds |
| Nitrocellulose | 4½ pounds |

Solvents such as denatured alcohol, ethyl acetate, isopropyl alcohol, butyl alcohol and their acetates, and various other solvents regarded as effective for many purposes are not nearly as serviceable in a composition of the monochlorobenzene type to secure a cutting speed approximating or excelling that of the standard benzol removers. Hence I prefer to employ the very lightest and most powerful loosening solvents of which anhydrous methanol is an excellent example. A mixture of several of these highly volatile loosening agents is preferred for effectiveness to a single solvent. Methyl acetate is a very desirable addition since it tends to co-operate with the other loosening solvents to modify the rate of evaporation.

In some cases, however, there may be added a slight proportion of a heavy solvent such as "cellosolve," ethyl oxybutyrate, dibutyl phthalate, and the like. Approximately 5% suffices to prevent the remover composition on protracted exposure from drying out on the surface to form a white milky coating. The addition of 5% of such heavy solvents, while reducing the cutting speed somewhat does not make a material change in this respect. However, it adds to the cost of the remover and in some cases I prefer to have a composition which eventually will dry if exposed in thin layers to form a white milky coating as the presence of milkiness of this character on the clean surface is an indication that the washing off of the residue of the remover has not been complete.

Proceeding in the foregoing manner satisfactory removing composition may be made in which the content of wax is between one-half ounce and one ounce to the gallon of the finished composition. The lower proportion of wax, namely one-half ounce, reduces the wax-hazard to such a point that I have been able to spread a remover made with this proportion of wax over a surface, such as a metal panel, wipe off the remover somewhat, thereby leaving a thin coating, on which after drying I have applied nitrocellulose lacquer and have had this lacquer dry as rapidly as a corresponding panel which did not have any pre-treatment with the remover. When I tried the same experiment with the higher wax compositions of the benzol type appearing on the market the lacquer was found to be very slow in drying, requiring several days before tackiness had disappeared.

In one of the preceding formulas "lugosol" has been mentioned. This solvent is made by treatment of acetone with a small amount of an alkaline condensation agent and distilling to collect separately that portion boiling from say 60° C. to an end point. This heavier fraction resulting from condensation has nearly the activity of acetone and may be very cheaply prepared.

"Cellosolve" has been referred to above. This is understood to be the commonly accepted trade name for the alkyl ethers of ethylene glycol and is so used herein. Thus the methyl ether is commonly called, for short, "methyl cellosolve".

It should be understood that I do not wish to be limited to the particular loosening solvents set forth but may use other solvents having slower loosening properties although I prefer if using such slower solvents to employ therewith a proportion of one of the higher-powered loosening solvents. In some cases I may employ with monochlorobenzene a proportion of orthodichlorobenzene as, for example, 10 to 50% of the monochloro compound may be replaced by the dichloro compound.

In certain cases I may incorporate with the monochlorobenzene a proportion of toluol, solvent naphtha, and the like, even though such additions detract from the cutting qualities slightly.

From the foregoing it will be evident that I seek first and foremost to provide an organic solvent remover free from any objectionable content of benzol and possessing a cutting speed in the neighborhood of that of the standard benzol remover and preferably exceeding the speed of the latter. To secure a removing composition free from benzol having a cutting speed equal to or slightly exceeding the standard benzol remover monochlorobenzene preferably is employed without the addition of the more sluggish solvents of the petroleum type, or toluol, xylol, and so forth.

By the employment in the preferred form of the invention of a wax precipitant in excess of the wax solvent it becomes possible to employ a proportion of wax below that at which solidification will occur at temperatures in the neighborhood of the temperature of melting ice. The proportion of the wax solvent therefore is of importance in this connection. If congealation at this temperature is not objectionable a higher proportion of wax may be employed in some cases. Preferably, however, wax not to exceed one and one-half ounces avoirdupois per gallon of the finished remover is employed, such wax being preferably subjected to the action of a protective colloid of the nitrocellulose type, said colloid preferably being of high viscosity nitrocellulose in order to eliminate as far as possible any material content of fixed solids, thereby providing a composition which is almost wholly straight solvent. Using wax in such proportion and in excess of wax solvent in the presence of said protective colloid, any thickener whose specific gravity is substantially increased by the presence of monochlorobenzene, congealation at the lower range of working temperatures is prevented and a cold-test remover is produced.

In general I prefer to have the composition neutral, being both free from acid and alkali and therefore preferably avoid the introduction of aliphatic chlorinated bodies such as carbon tetrachloride, chloroform and similar chlorinated hydrocarbons which have a tendency to become acid and hence to attack the metal container in which removers customarily are packaged.

What I claim is:

1. A neutral, film-forming paint, varnish and lacquer removing composition comprising ceresin wax, monochlorobenzene serving as the essential wax solvent and wax precipitants, substantially all taken from the herein described group consisting of methanol, methyl acetate, acetone, methyl acetone and "lugosol," the proportion of the precipitant being in excess of the wax solvent; the proportion of wax being less than two ounces avoirdupois per gallon, whereby wax-hazard is minimized: said composition carrying a high viscosity bodying agent comprising nitrocellulose in excess of the proportion of wax, said wax being dispersed and colloided in a vehicle of a specific gravity approaching that of the wax, the proportion of wax being insufficient to congeal the composition at the lower range of working temperatures: said composition being substantially free from benzol but having a cutting speed approximating that of standard benzolic remover.

2. A neutral, film-forming paint, varnish and lacquer removing composition comprising wax, monochlorobenzene serving as the essential wax solvent and wax precipitants, substantially all taken from the herein described group consisting of methanol, methyl acetate, acetone, methyl acetone and "lugosol", the proportion of the precipitant being in excess of the wax solvent; the proportion of wax being less than two ounces avoirdupois per gallon, whereby wax-hazard is minimized: said composition carrying a high viscosity bodying agent comprising nitrocellulose in excess of the proportion of wax, the wax being dispersed and colloided in a vehicle of a specific gravity approaching that of the wax, the proportion of wax being insufficient to congeal the composition at the lower range of working temperatures: said composition being substantially free from benzol but having a cutting speed at least equal to that of standard benzolic remover.

3. A neutral, film-forming paint, varnish and lacquer removing composition comprising wax, monochlorobenzene serving as the essential wax solvent and wax precipitants, substantially all taken from the herein described group consisting of methanol, methyl acetate, acetone, methyl acetone and "lugosol"; said composition carrying a high viscosity bodying agent comprising nitrocellulose in excess of the proportion of wax, the wax being dispersed and colloided in a vehicle of a specific gravity approaching that of the wax, the proportion of wax being insufficient to congeal the composition at the lower range of working tempertures: said composition being substantially free from benzol but having a cutting speed approaching that of standard benzolic remover.

4. As a neutral, film-forming paint, varnish and lacquer remover a non-benzolic wax-containing solvent composition containing monochlorobenzene as the essential wax solvent incorporated with wax precipitants taken at least largely from the herein described group consisting of methanol, methyl acetate, acetone and methyl acetone, and an amount of wax not substantially above 1%.

5. A finish remover containing wax to the extent of not over two ounces per gallon, chlorbenzol as the essential wax solvent and an amount of wax-precipitating solvent substantially in excess of the amount of such wax solvent, such loosening solvent being composed at least in major part of substances selected from the group consisting of acetone, "lugosol," methyl acetate, methyl alcohol and methyl acetate; such remover containing nitrocellulose in amount substantially greater than the amount of the wax, by which the wax is rendered substantially colloidal, such remover remaining fluid at 0° C., such remover being substantially free of benzol and being neutral.

6. A finish remover containing wax to the extent of not over two ounces per gallon, chlorbenzol constituting not substantially below half of the total solvent present constituting the essential wax solvent and an amount of wax-precipitating loosening solvent substantially in excess of the amount of such wax solvent, such loosening solvent being composed at least in major part of substances selected from the group consisting of acetone, "lugosol," methyl acetone, methyl alcohol and methyl acetate; such remover containing nitrocellulose in amount substantially greater than the amount of the wax, by which the wax is rendered substantially colloidal, such remover remaining fluid at 0° C., such remover being substantially free of benzol, and being neutral.

7. A finish remover containing wax to the extent of not over two ounces per gallon, chlorbenzol as the essential wax solvent and an amount of wax precipitating loosening solvent substantially in excess of the amount of such wax solvent, such loosening solvent being composed at least in major part of substances selected from the group consisting of acetone, "lugosol," methyl acetone, methyl alcohol and methyl acetate; such remover containing nitrocellulose in amount substantially greater than the amount of the wax, by which the wax is rendered substantially colloidal, such remover remaining fluid at 0° C., such remover being substantially benzol-free, and having its wax in a colloidized non-settling condition, such remover being neutral and having a cutting speed not greatly below that of a standard benzolic remover containing 50 to 60% of benzol, with the balance methyl acetate and containing 3 ounces of paraffin wax per gallon.

CARLETON ELLIS.